United States Patent [19]
Hovekamp

[11] 3,894,638
[45] July 15, 1975

[54] RECIPROCATING STACKER FOR GENERALLY LAMINAR ARTICLES

[75] Inventor: John C. Hovekamp, Mansfield, Ohio

[73] Assignee: Buckler Industries, Inc., Mansfield, Ohio

[22] Filed: Sept. 13, 1973

[21] Appl. No.: 396,993

[52] U.S. Cl. ............................ 214/6 DK; 271/190
[51] Int. Cl. ........................................... B65g 57/10
[58] Field of Search .......... 214/6 DK, 6 P; 271/190, 271/191

[56] References Cited
UNITED STATES PATENTS

| | | | |
|---|---|---|---|
| 2,875,908 | 3/1959 | Woodcock | 214/6 DK |
| 3,404,788 | 10/1968 | Thomas et al. | 214/6 DK |
| 3,570,685 | 3/1971 | Carlson | 214/6 DK |

Primary Examiner—Albert J. Makay
Assistant Examiner—Leslie J. Paperner
Attorney, Agent, or Firm—Cain and Lobo

[57] ABSTRACT

An apparatus for continuously stacking a plurality of stackable, generally laminar articles, such as plates or sheets, includes a reciprocating conveyor onto which each article is successively deposited and from which each is successively parted so as to fall in a pile or stack below. The upper surface of the article is not contacted by any portion of the mechanism. The conveyor comprises a frame, a pair of oppositely disposed endless flexible transport means, such as chains, trained on sprockets rotatably disposed on the frame, and support means held intermediate the chains. An article of essentially uniform thickness is deposited on the support means at the in-feed end of the conveyor, and the support means is advanced a predetermined distance and then retracted. Stop means or 'fingers' are rotatably disposed above the support means near the infeed end of the conveyor, so as to contact an edge of the article and stop its motion as the support means is retracted. The article is thus parted laterally relative to the surface of the support means. Each succeeding article is similarly parted and may be permitted to fall on a preceding article thus forming a pile or stack.

11 Claims, 4 Drawing Figures

PATENTED JUL 15 1975 3,894,638
SHEET 2
Fig. 2
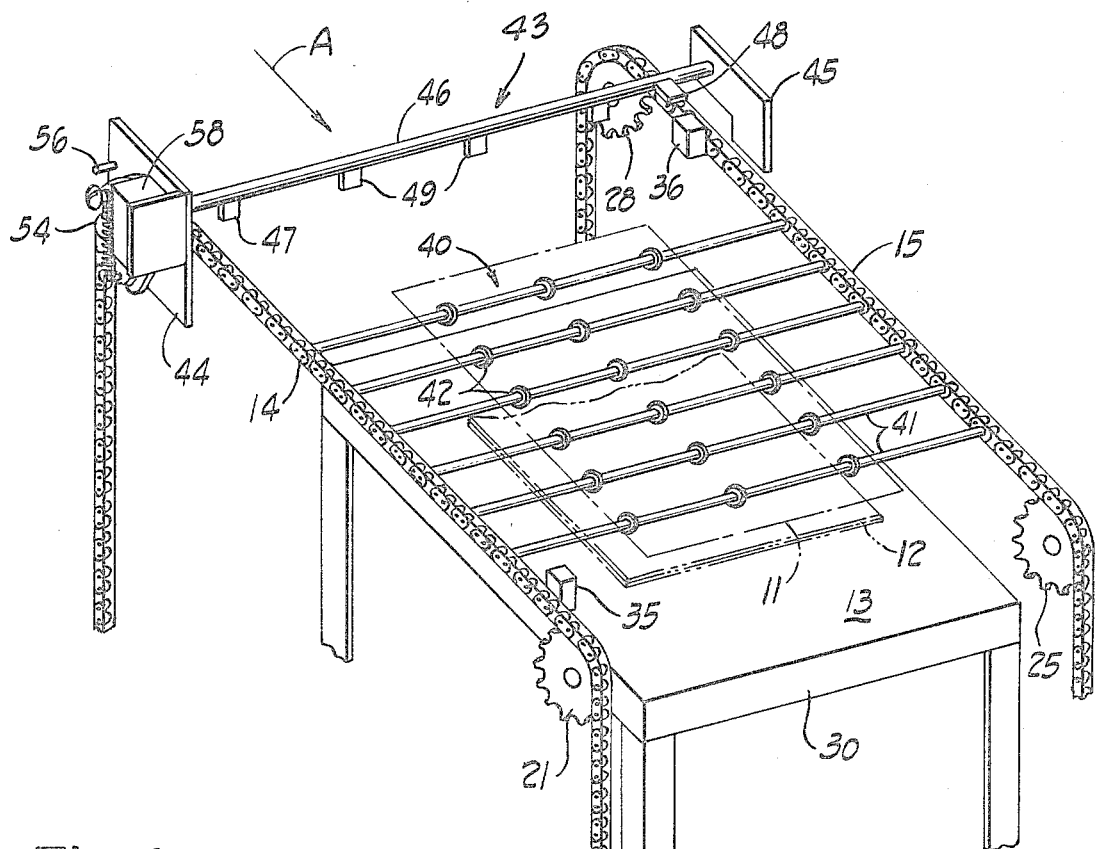
Fig. 4
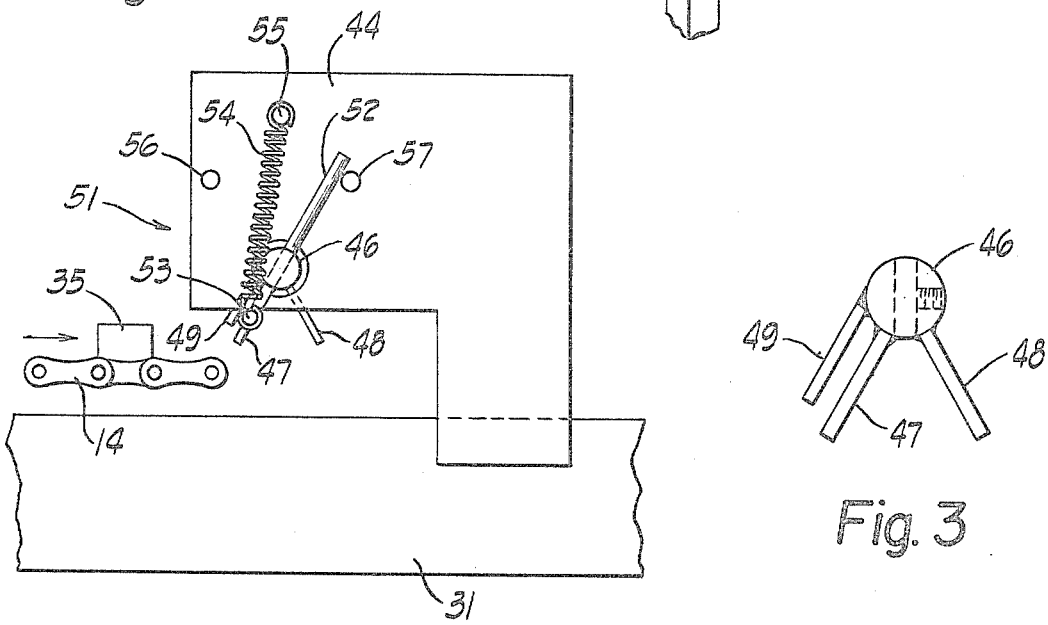
Fig. 3

RECIPROCATING STACKER FOR GENERALLY LAMINAR ARTICLES

BACKGROUND OF THE INVENTION

The present invention relates to a stacking device for the handling of generally laminar shaped articles which are laterally stackable in a pile.

A large number of relatively flat shaped articles are made in numerous fields of manufacture, and where the articles are conveyed one at a time, it is often desirable to form a pile of the articles before they are moved from one manufacturing station to another station. In general, the problem of forming a stack arises in the handling and transportation of practically all generally laminar or flat objects, such as sheets of plastic, plywood, steel, printed publications and the like; and, with various types of structural panels such as those formed from sheet metal, wood, plastic, and combinations of the foregoing.

A large number of devices are used in the art, each of which is particularly suited for the stacking of a specific article. Though certain features of a device for stacking one type of article may be modified for incorporation in a device to stack a different type of article, prior art devices are generally constructed for a specific stacking or piling operation and are both difficult and uneconomical to modify for a different article.

Many stacking devices operate in such a manner that the articles to be stacked are first diverted from the plane in which they are conveyed so that each object comes to rest, usually on one of its lateral edges, and it is then conveyed in a direction at right angles to its surface until it comes to rest against other objects similarly transported, to form a pile. The pile thus formed is further handled, for example sheets of wallboard are taped, sheets of plywood are tied or banded. Such devices are suited for stackable flat articles which have sufficient rigidity to be conveyed on a lateral edge. However, where the object has very little stability when stood on edge, or where it is imperative that the edges of the article be protected from damage, the stacking device must operate to stack the articles laterally, that is in a horizontal plane, one on top of the other.

The problems of stacking an unstable laminar sheet inherent particularly to the handling of thin, flexible photolithographic plates which are formed of thin metal such as aluminum. Such plates must be stacked laterally, without damaging the edges and without contacting the photosensitive surface of the plate before it is stacked. Presently there is no effective way to do this. Consequently the plates are manually stacked, requiring the attention and expense, of an operator whose services may more profitably be utilized elsewhere. It is to the solution of these problems economically, in a surprisingly simple and effective manner, that this invention is directed.

SUMMARY OF THE INVENTION

It is therefore a general object of this invention to provide a new and improved apparatus for laterally or horizontally stacking a plurality of stackable, generally laminar articles, by laterally parting each from a support means of a reciprocating conveyor.

It is another general object of this invention to provide a reciprocating conveyor for stacking flat articles which are thin and flexible, continuously or discontinuously supplied thereto.

It is still another general object of this invention to provide a device for stacking generally laminar articles having at least one scuffable surface in a pile without causing deleterious scraping or dragging between the upper surface of an article on the pile and a succeeding article deposited thereon.

It is a specific object of this invention to stack plural plates laterally or horizontally with a reciprocating conveyor, one at a time, without contacting the upper surface of the plates before they are stacked.

It is a more specific object of this invention to stack treated lithographic plates with a reciprocating conveyor coacting with a stop means to laterally part each plate from the surface of the support means of the conveyor, and to permit each to fall into horizontally stacked relationship with another on a cart, or receiving surface proximately disposed beneath the support means.

It is still another specific object of this invention to provide a movable support grid for a generally laminar article, which grid is reciprocably actuated by a toggle pin, first in a forward direction for a predetermined distance over a receiving surface or which the articles are to be piled, and then in a reverse direction to engage the article against a rotatable stop means which holds the object in position while the support grid is being retracted.

It is also a specific object of this invention to provide a stacker for a relatively long, thin flexible plate, which stacker deposits one plate on another plate in a pile by imparting a generally arcuate, concave disposition to the plate as it is discharged onto a receiving surface, thus avoiding such relative motion between the plates as to scratch, abrade, or otherwise damage either surface of each plate.

It is yet another specific object of this invention to provide a stacker having a retractable support means for a thin flexible plate, such as an off-set lithographic plate, and means, disposed above the path of movement of the support means, to part the plate laterally from the support means so that one edge comes or nearly comes to rest on a proximately disposed receiving surface, before the plate is parted.

It is a still further object of this invention to provide a rugged efficient and surprisingly simple mechanism which may be operated by untrained personnel.

It is another object of this invention to provide an apparatus for stacking generally laminar articles laterally, to form a pile of the articles utilizing a reciprocating conveyor to which the articles are continuously or discontinuously supplied, and to stack plural articles, one at a time, without contacting the upper surface of the plates before they are stacked.

These and other objects, features and advantages of this invention will become apparent to those skilled in the art from the following description of preferred forms thereof and the illustrations set forth herein.

BRIEF DESCRIPTION OF THE DRAWINGS

FIG. 2 shows a diagrammatic perspective view of the reciprocating stacker with the support grid in the advanced position, and about to be retracted.

FIG. 3 is an end elevation view of the shaft assembly showing the angular disposition of portions thereof.

FIG. 4 is an end elevation view of the toggle assembly and side plate mounted on one side of the frame, portions of which are broken away.

DETAILED DESCRIPTION OF PREFERRED EMBODIMENTS OF THE INVENTION

Figure 1:
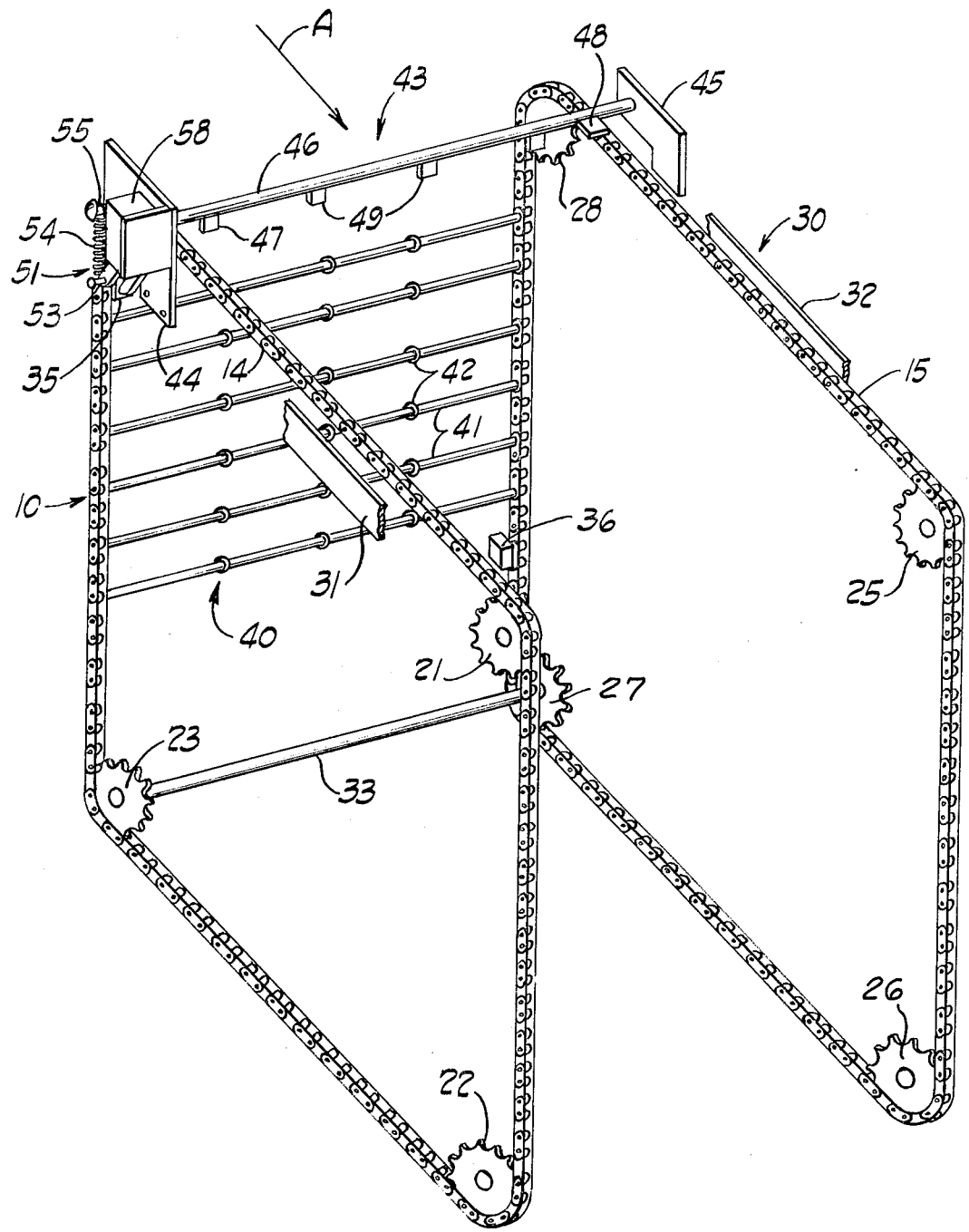
FIG. 1 shows a diagrammatic, perspective view of the reciprocating stacker with the support grid in the retracted position, and about to commence its forward motion.

In a preferred embodiment of the invention described hereinbelow, individual photolithographic offset plates are stacked sequentially. Stacking of offset plates is desirable in printing plates particularly where the plates have been treated to provide a photosensitive surface, and which are to be transported in a pile, rather than individually, for further processing. It will be recognized that the photosensitive layer on a plate of this type is such that it is easily damaged when contacted with moving mechanical parts, and it is thus necessary that the plate be stacked without contacting their photosensitive surface. Thus, plates to be stacked are supplied to the stacker of this invention from any one of numerous machines such as are presently used to coat, or to develop, or to gum, or otherwise process the plates stepwise, or essentially continuously.

It is immaterial whether the plates are processed according to the requirements of additive type plates or subtractive type plates, as is the type of machine used to process the plates. Machines specifically adapted to process lithographic plates are disclosed in U.S. Pat. Nos. 3,608,464; 3,593,641; 3,589,261; 3,562,834; 3,448,720; and others, including my copending U.S. Pat. applications Ser. Nos. 350,129 and 386,510. Processed plates must be supplied to the device of this invention in a lateral or horizontal position. After a predetermined number of plates have been stacked in a pile, the pile is removed and another pile started.

Typically, offset plates may be as large as several feet in one or both lateral dimensions, but less than one-sixteenth inch thick, the most commonly used being in sizes corresponding to those of newspapers, magazines, and other publications. It will be evident that this embodiment of the invention is useful for stacking any generally laminar stackable article including magazine-type publications, corrugated sheet, structural panels and the like, but more particularly those which have inadequate natural stability in the vertical, or on-edge, position.

Referring now to FIGS. 1 and 2, the stacking apparatus of this invention includes a reciprocating conveyor, shown generally at 10, supporting a thin plate 11 to be stacked horizontally in a rectangular pile 12 on the surface of a wheeled carriage or other receiving surface 13. The conveyor 10 includes endless flexible means for transporting the article, such as oppositely disposed endless chains or cables 14 and 15, the chains being preferred. The chain 14 is drivingly trained upon sprockets 21, 22, 23 and 24 (not shown) and the chain 15 is drivingly trained upon sprockets 25, 26, 27 and 28, all sprockets 21–28 having the same pitch. It will be recognized that, where a flexible cable or belt is used, suitable pulleys would be used instead of sprockets.

Each sprocket is rotatably disposed on a rectangular frame 30, sprockets 21–24 on the right hand side 31, and sprockets 25–28 on the left hand side 32, as viewed facing the conveyor in the direction of the arrow A. This direction also indicates the direction in which plates, supplied to the in-feed end of the conveyor, are transported, before they are fallingly stacked at the out-feed end.

Intermediate the chains 14 and 15, and attached thereto, is provided a support means, or support grid, shown generally at 40. The support grid 40 may be any suitable means which provides adequate lateral support for the plate, without touching its edges. Typically, the support grid includes a plurality or rods 41 disposed in a horizontal plane on axial pins (not shown) carried by chains 14 and 15 respectively, to form a supporting grid for the plate 11. The rods 41 are provided with spacers 42 disposed intermediate their lengths, to maintain the plate 11 in spaced-apart relationship from the rods 41, so as to facilitate stripping the plate 11 from the supporting grid 40, as will be explained more fully hereinafter. For better operation, it is preferred that the spacers 42 be discus-shaped rubber washers, freely rotatable on the rods 41 to minimize friction on the plate when the grid is retracted. In FIG. 1 the supporting grid 40 is represented in its starting or fully retracted position, awaiting a signal that a plate is to be supplied to the grid. Such a signal may be supplied by a limit switch triggered by the plate or by a photoelectric eye (not shown), the particular type of signal means being unimportant. For example, where the stacking device is supplied with plates from a machine in which they have been coated, a direct switch is provided on the discharge end of the machine, which switch is actuated by a coated plate.

Sprockets 23 and 27 are preferably adapted to be driven by a common drive shaft 33 to ensure that both chains 14 and 15 are driven at the same speed, and in the same direction so as not to strain unduly the support grid 40. The drive shaft 33 is driven by a reversible electric motor (not shown in the FIGS.) through a suitable reducing gear box (not shown) in a conventional manner.

A trip block 35 is mounted on an offset link in chain 14 inwardly from the right hand side 31 of the frame and a trip block 36 is similarly mounted on chain 15 inwardly from the left hand side 32 as shown in FIG. 2. The trip blocks 35 and 36 are disposed in front of and behind the support grid 40.

The frame 30 is provided with a shaft assembly shown generally at 43 disposed above the support grid at the in-feed end of the conveyor, and supported by side plates 44 and 45 on the right hand side 31 and left hand side 32 respectively, of the frame. The shaft assembly 43 includes a trip bar 46 journalled near its ends in side plates 44 and 45. The trip bar 46 has fixedly attached to it a pair of trip plates 47 and 48 which may be tripped by trip blocks 35 and 36 respectively. Trip plates 47 and 48 are angularly disposed, symmetrically about a vertical axis through the trip bar 46, as seen in FIG. 3. The trip bar 46 also carries intermediate its ends, plural stop means, stop plates or fingers 49 which extend downwardly and terminate above the surface of the rods 41. Stop plates 49 are also angularly similarly disposed with respect to the vertical axis through the trip bar 46, the angle being so chosen that when trip plate 48 is tripped into the "down" position by trip block 36, the stop plates 49 interfere with the plate 11 while the support grid 40 is being retracted, maintaining the plate 11 in abutment against the stop plates until the grid 40 is sufficiently retracted to permit the plate to be fallingly discharged from the grid. Soon after the plate 11 is discharged from the support grid 40, trip block 35 impacts the trip plate 47 and raises the stop plates 49 into the "up" to position, readying the grid to accept a subsequent plate to be supplied to it.

One end of the trip bar 46 is provided with a toggle assembly shown generally at 51 which includes a toggle pin 52 disposed in the trip bar at a right angle to the longitudinal axis of the bar, as shown in FIG. 4. One end of the toggle pin has affixed thereto a spring pin 53 to which a spring means 54 is attached. The spring 54 may be disposed between the spring pin 53 and another spring pin 55 in the side plate 44 so as to bias the toggle pin in either a 'forward' position against a pin 56, or in the 'reverse' position against a pin 57. Both pins 56 and 57 are set in side plate 44 approximately symmetrically disposed with respect to the pin 55. Pins 56 and 57 serve to trigger a limit switch 58, also mounted in side plate 44, which switch effects a change in the direction of rotation of the electric motor (not shown) depending upon whether the support grid 40 is to be advanced or retracted.

This preferred embodiment of the stacking device of this invention is placed in operation by placing it in a position to receive lithographic plates which have been previously processed or treated. If a plate is still wet after it is processed this device may be fitted with a pair of feed rolls which may serve to squeeze away excess moisture when a plate is fed between them, and to flatten a slightly bent plate, before it is supplied to the grid 40. A sensing means, which senses that a plate is about to be supplied to the support grid 40, actuates the electric motor (not shown) and advances the support grid forward from its retracted position in the same direction and at about the same rate as the plate being supplied to the support grid. The support grid is advanced for a predetermined distance, over the receiving surface on which the plates are to be stacked, with the plate resting on the spacers 42. The plate passes under the stop plates or fingers 49 which are in the up position, and, when the predetermined distance has been travelled, the trip block 36 trips the trip plate 48 and places the fingers 49 is the down position. At the same time, the toggle pin is indexed to actuate the limit switch and reverse the motor, thus commencing retraction of the grid 40. As the grid is retracted, the rear edge of the plate is thus placed in abutment against the stop plates 49 of the shaft assembly, which stop its motion. It will be apparent that the stop plates 49 are disposed intermediate the spacers 42 so as not to interfere therewith. The spacers 42 are of sufficient diameter so as to place the plate resting thereon sufficiently above the rods 41 to permit the stop plates 49 to strip the plate without interfering with the retraction of the support grid 40. Where the article is relatively thick or of such shape (for example, a corrugated sheet) that the article may be stripped without the use of spacers, the spacers may be omitted. Whether or not spacers are used, the trip bar and stop plate means are rotatably disposed to penetrate the path of movement of said grid. When the grid is sufficiently retracted the plate is fallingly discharged on to the receiving surface of the wheeled carriage 13 which may be wheeled into and out of position through the forward portion of the rectangular frame 30.

Optionally, for good operation, it is preferred to provide each endless chain with means for adjusting the tension, such as, for example, an idler sprocket on a tensioning arm (not shown) which may be locked into position for the desired tension of the chains. Similarly, it may be desirable to provide delay means in the electrical circuit, to delay the support grid either in the fully extended or fully retracted position. Again, it is also deemed desirable to provide safety trip blocks (not shown) in addition to the trip blocks 35 and 36 to prevent accidental starting of the conveyor because the toggle switch may have been manually inadvertently indexed. Such modifications of the stacker of this invention, like the basic operations described hereinabove, may be effected utilizing conventional circuitry.

The stacker of this invention is particularly useful for thin, flexible articles such as offset lithographic plates, glass fiber reinforced synthetic resinous panels whether corrugated or not, relatively flexible plywood panels which have at least one veneered or otherwise finished surface, and the like, because it permits one article to be stacked on another with a minimum of scuffing motion between them. Particularly when an article is relatively long, this stacker permits one edge of the article to come to rest on the receiving surface as it is discharged from the support grid, and then, as the grid is further retracted, imparts a generally arcuate, concave profile to the article. The concave attitude of the article allows it to be laid down on a pile, gently, with no noticeable relative horizontal movement between an article being deposited on the pile and the uppermost article thereon. The mechanism described hereinabove effects this desirable stacking motion in an efficient, rugged, and unexpectedly economical and uncomplicated manner. Moreover, the path of movement of the reciprocating support grid disposed in the stacker in the manner described hereinabove, permits a wheeled carriage to be removably introduced under the support grid. This allows any predetermined number of articles to be piled on the receiving surface of the wheeled carriage, which may then be wheeled away without dismantling any portion of the stacker. Typically, the stacking of articles will be interrupted while one pile is wheeled away, and another pile started. However, if the stacking frequency is slow enough, substitution of one wheeled carriage for another may be effected with the stacker operating continuously.

Modifications, changes and improvements to the preferred form of the invention herein disclosed, described and illustrated may occur to those skilled in the art who come to understand the principals and precepts thereof. Accordingly the scope of the patent to be issued herein should not be limited to the particular embodiments of the invention set forth herein, but rather should be limited by the advance of which the invention has promoted the art.

What is claimed is:

1. An apparatus for stacking laminar articles, one article at a time, in a pile, comprising a movable support means for said article supplied to said support means in a generally horizontal attitude, said support means being attached between oppositely disposed endless flexible transport means being operatively supported by a frame, said support means being extensible to, and retractable from, a position overlying a receiving surface for said article, oppositely disposed tripping means mounting on said flexible transport means in front of and behind said support means, shaft assembly means disposed near the in-feed end of said apparatus, said shaft assembly means including a trip bar with trip plate means oppositely disposed near the ends of said trip bar in selective interfering relationship with said tripping means, and stop plate means disposed intermediate said trip plate means in interfering relationship with said articles when said support means is retracted, drive means for said flexible transport means to advance and retract said support means, and toggle means cooperating with said shaft assembly means, to alternately actuate said drive means to advance said support means while transporting said article to a position overlying said receiving surface, and, to retract said support means to fallingly discharge said article.

2. The stacker according to claim 1 wherein said support means is reciprocable in a horizontal plane parallel to the plane of said receiving surface and said trip bar and said stop plate means are rotatably disposed to penetrate the path of movement of said article without penetrating the path of movement of said support means.

3. The stacker according to claim 1 including means for delaying the movement of said support means in either a fully extended or fully retracted position.

4. The stacker according to claim 1 wherein said receiving surface is provided by a wheeled carriage removably introducable through the out-feed end of said frame.

5. The stacker according to claim 1 wherein said endless flexible transport means are chains.

6. The stacker according to claim 1 wherein said oppositely disposed endless flexible transport means are driven through a common drive shaft.

7. The stacker according to claim 1 wherein said article is an off-set lithographic plate.

8. An apparatus for stacking articles, one article on another, comprising a movable support means for said article supplied to said support means, said suppot means being attached between oppositely disposed endless flexible transport means being operatively supported by a frame, said support means being extensible to, and retractable from, a position overlying a receiving surface for said article, stop means to interfere with said article and to part it laterally from said support means, first tripping means mounted on said flexible transport means forwardly of said support means to trip said stop means into non-interfering relationship with an article to be supplied to said support means, and second tripping means mounted on said flexible transport means rearwardly of said support means to trip said stop means into interfering relationship with said article when said support means is retracted to fallingly discharge said article one at a time onto a receiving surface to form a pile, and reversible drive means for said transport means to move said support means reciprocably over a predetermined distance within said frame.

9. A stacking device to stack one stackable shaped article on another, comprising a frame, oppositely disposed endless flexible transport means operatively supported by said frame, a support means disosed intermediate said flexible transport means to support said article, reversible drive means for said transport means to move said support means reciprocably over a predetermined distance within said frame, stop means to interfere with said shaped article and to part it laterally from said support means, first tripping means mounted on said flexible transport means to trip said stop means into noninterfering relationship with an article to be supplied to said support means, and second tripping means mounted on said flexible transport means to trip said stop means into interfering relationship with said article when said support means is retracted, to fallingly discharge one article at a time onto a receiving surface to form a pile.

10. A stacking device to stack a stackable shaped article on another, comprising a frame, oppositely disposed endless flexible transport means operatively supported by said frame, a support means disposed intermediate said flexible transport means to support said article, reversible drive means for said flexible transport means to move said support means reciprocably over a predetermined distance within said frame, stop means to interfere with said shaped article and to part it laterally from said support means, and means mounted on said flexible transport means for selectively disposing said stop means into a first position out of contact with an article being supplied to said support means as said support means moves in one direction and into a second position in interfering contact with the article to discharge the same from said support means as said support means moves in the opposite direction.

11. The stacker according to claim 10 in which said means for selectively disposing said stop means further comprises a first tripping means for disposing said stop means into the said first position and a second tripping means for disposing said stop means into the said second position, said first and second tripping means being mounted at opposite ends of said support means.

* * * * *